US012664768B2

(12) United States Patent
Venkataramani

(10) Patent No.: US 12,664,768 B2
(45) Date of Patent: Jun. 23, 2026

(54) FAILURE MODE ANALYSIS USING NATURAL LANGUAGE DESCRIPTORS

(71) Applicant: GE Precision Healthcare LLC, Waukesha, WI (US)

(72) Inventor: Rahul Venkataramani, Bangalore (IN)

(73) Assignee: GE Precision Healthcare LLC, Waukesha, WI (US)

( * ) Notice: Subject to any disclaimer, the term of this patent is extended or adjusted under 35 U.S.C. 154(b) by 329 days.

(21) Appl. No.: 18/485,923

(22) Filed: Oct. 12, 2023

(65) Prior Publication Data

US 2025/0124695 A1    Apr. 17, 2025

(51) Int. Cl.
| | |
|---|---|
| *G06F 40/279* | (2020.01) |
| *G06F 40/40* | (2020.01) |
| *G06V 10/776* | (2022.01) |
| *G06V 10/778* | (2022.01) |
| *G06V 10/94* | (2022.01) |
| *G06V 20/50* | (2022.01) |

(52) U.S. Cl.
CPC .......... *G06V 10/776* (2022.01); *G06F 40/279* (2020.01); *G06F 40/40* (2020.01); *G06V 10/7788* (2022.01); *G06V 10/945* (2022.01); *G06V 20/50* (2022.01); *G06V 2201/03* (2022.01)

(58) Field of Classification Search
CPC ............. G06V 10/776; G06V 10/7788; G06V 10/945; G06V 20/50; G06V 2201/03; G06F 40/279; G06F 40/40
See application file for complete search history.

(56) References Cited

U.S. PATENT DOCUMENTS

| | | | |
|---|---|---|---|
| 12,367,396 B1 * | 7/2025 | Rauschmayr | .......... G06N 3/088 |
| 2019/0034822 A1 * | 1/2019 | Farré Guiu | ........... G06N 5/022 |
| 2021/0303910 A1 * | 9/2021 | Powell | .................. G06F 18/214 |
| 2022/0284579 A1 * | 9/2022 | Nye | ....................... G16H 40/63 |

(Continued)

OTHER PUBLICATIONS

Henn, T., Sakamoto, Y., Jacquet, C., Yoshizawa, S., Andou, M., Tchen, S., Saga, R., Ishihara, H., Shimizu, K., Li, Y., & Tanno, R. (2021). A principled approach to failure analysis and model repairment: Demonstration in medical imaging. Lecture Notes in Computer Science, 509-518. (Year: 2021).*

(Continued)

*Primary Examiner* — John Villecco
*Assistant Examiner* — Kyla Guan-Ping Tiao Allen

(57) ABSTRACT

In one embodiment, a method is provided for determining one or more failure modes of a machine learning model. In accordance with certain such embodiments, one or more images are accessed or acquired from a first source. The one or more images are processed using a machine learning model. The machine learning model outputs one or more processed images. One or more failure cases of the machine learning model are detected in the one or more processed images. One or more respective images corresponding to the one or more failure cases are processed using a text description generating framework configured to generate one or more text descriptors for each image corresponding to a failure case. One or more failure modes of the machine learning model are determined based on the text descriptors generated for the images corresponding to the failure cases.

20 Claims, 8 Drawing Sheets

(56) References Cited

U.S. PATENT DOCUMENTS

| 2023/0111047 A1* | 4/2023 | Brin | G06F 18/40 |
| | | | 706/12 |
| 2023/0186601 A1* | 6/2023 | Hartley | G06Q 30/00 |
| | | | 382/103 |
| 2024/0201911 A1* | 6/2024 | Oka | G06F 3/1286 |

OTHER PUBLICATIONS

Gholizadeh et al., "Model Explainability in Deep Learning Based Natural Language Processing", arXiv:2106.07410v1 [cs.AI] Jun. 14, 2021, https://arxiv.org/pdf/2106.07410, 12 pages.

* cited by examiner

FAILURE MODE ANALYSIS USING NATURAL LANGUAGE DESCRIPTORS

TECHNICAL FIELD

The present disclosure is related to determining one or more factors causing failure modes of a machine learning model. More specifically, the present disclosure is related to using a multi-modal representation learning framework to generate natural language descriptors that may be used to facilitate the identification of factors associated with or causing failure modes associated with the machine learning model.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Medical diagnostic imaging systems generate images of a subject in response to exposure to an energy source, such as X-rays passing through a patient, for example. The generated images may be used for many purposes, such as diagnostic purposes and/or longitudinal studies where images are acquired of a given region over time in order to track the progress of a treatment or to monitor the region for changes. In practice, such image data may be invaluable in providing proper patient care.

With the development of machine learning models, aspects of image analysis in such contexts have been shifted to such models, thereby allowing human practitioners to focus their attention on addressing those cases not suitable for such analysis and to addressing other patient needs. However, such machine learning models may be constrained by the data used in their training, by the design of their learning architecture, and/or by the use case in which they are employed. As a result, such machine learning models may on occasion fail to generate the correct output (e.g., a classification based on an image or time series data set) for a given subject. While such failures are typically caught and addressed by medical care practitioners, there is room for improvement in the operation of such machine learning models so as to reduce such failures.

Further, it may be appreciated that model debugging and failure characterization are particularly relevant in medical imaging since mere accuracy numbers are not representative of the severity of failures. By way of example, if a particular race is under-represented in a test data set and if the model under-performs on the particular race, the average numbers may not be substantially affected and the failure mode may not be detected, leading to errors when deployed.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to the automated generation of text-based descriptors for failure cases determined for a set of machine learning outputs. By way of example, the machine learning outputs may correspond to processed or analyzed image data (e.g., medical image or video data) or time-series data. The text-based descriptors may comprise one or more text descriptors generated for each failure case using a multi-modal representation learning framework that receives image or time series data (e.g., a first mode of data) associated with each failure case as an input and automatically generates the one or more text descriptors (e.g., a second mode of data) associated with each failure case. The respective text descriptors generated for the failure cases may then be processed, such as using a cluster-based analysis and/or histogram analysis, to identify factors causing or associated with failure modes of the machine learning model to be addressed at the development stage of the machine learning mode (e.g., via re-training with additional sample data) and/or at the deployment stage (e.g., via information or instructions shared with users of the deployed model).

In one embodiment, a processor-implemented method is provided for determining one or more failure modes of a machine learning model. In accordance with this embodiment, one or more images are accessed or acquired from a first source. The one or more images are processed using a machine learning model. The machine learning model outputs one or more processed images. One or more failure cases of the machine learning model are detected in the one or more processed images. One or more respective images corresponding to the one or more failure cases are processed using a text description generating framework configured to generate one or more text descriptors for each image corresponding to a failure case. One or more failure modes of the machine learning model are determined based on the text descriptors generated for the images corresponding to the failure cases. The machine learning model is retrained based on the one or more failure modes or guidance is provided to users of the machine learning model based on the one or more failure modes.

In a further embodiment, one or more non-transitory computer-readable media are provided. In accordance with this embodiment, the computer-readable media comprise processor-executable code that, when executed by a processor, causes the processor to perform acts comprising: accessing or acquiring one or more images from a first source; processing the one or more images using a machine learning model, wherein the machine learning model outputs one or more processed images; detecting one or more failure cases of the machine learning model in the one or more processed images; processing one or more respective images corresponding to the one or more failure cases using a text description generating framework configured to generate one or more text descriptors for each image corresponding to a failure case; determining one or more failure modes of the machine learning model based on the text descriptors generated for the images corresponding to the failure cases; and retraining the machine learning model based on the one or more failure modes or providing guidance to users of the machine learning model based on the one or more failure modes.

In an additional embodiment, a processor-based system is provided. In accordance with this embodiment, the processor-based system comprises: one or more processors configured to execute processor-executable code; and one or more memory or data storage structures storing processor-executable code. The processor-executable code, when executed by the one or more processors, causes the one or more processors to perform acts comprising: accessing or acquiring one or more images from a first source; processing the one or more images using a machine learning model, wherein the machine learning model outputs one or more processed images; detecting one or more failure cases of the machine learning model in the one or more processed images; processing one or more images corresponding to the one or more failure cases using a text description generating framework configured to generate one or more text descriptors for each image corresponding to a failure case; and determining one or more failure modes of the machine learning model based on the text descriptors generated for the images corresponding to the failure cases.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
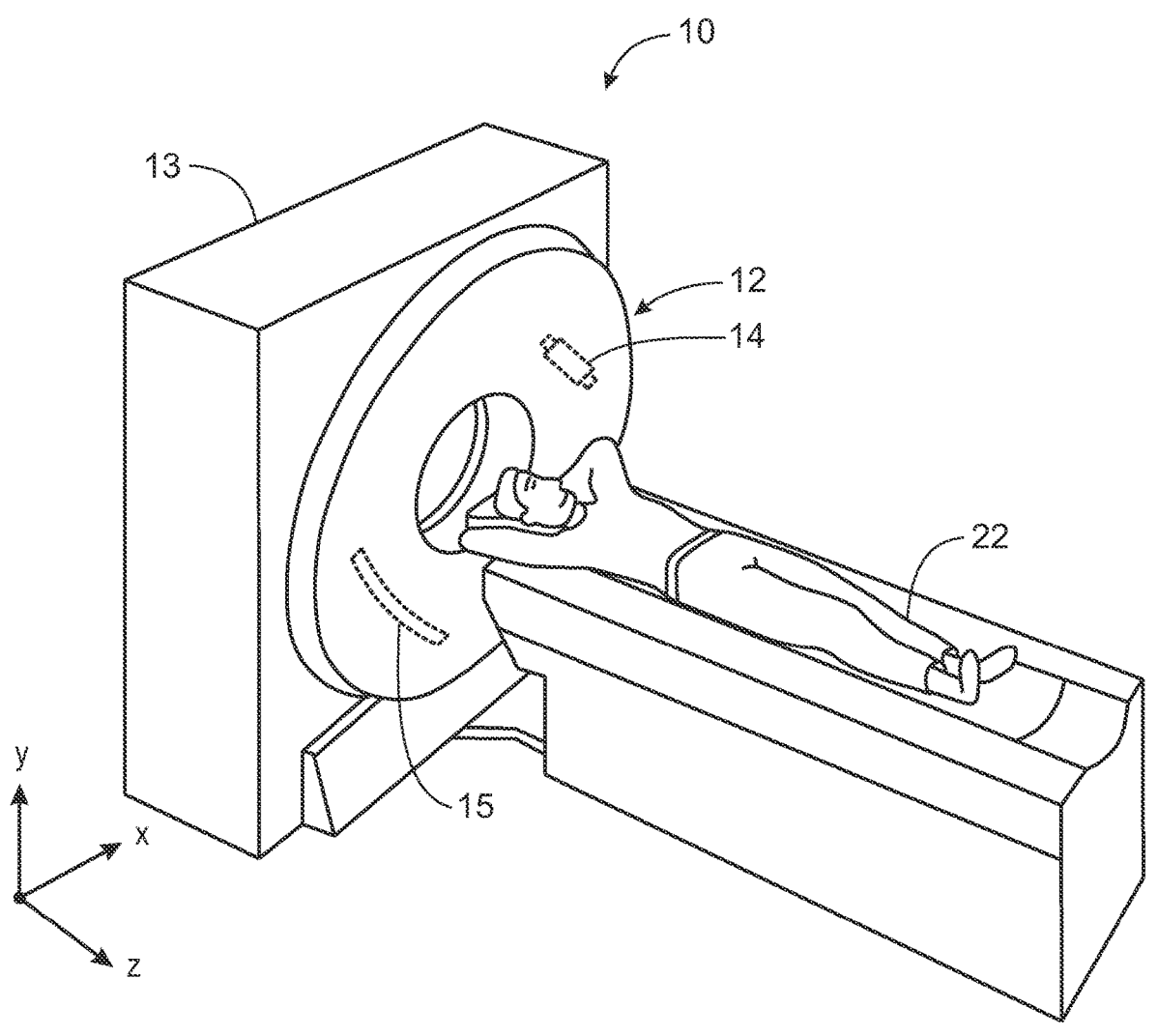
FIG. 1 is a pictorial representation of an imaging system, such as a CT imaging system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Medical imaging devices have been used for decades to non-invasively acquire image data of internal structures or physiological processes of a subject, allowing appropriate medical diagnoses to be made and care to be applied without injury to the subject. Examples of such medical imaging technologies include X-ray radiography, computed tomography (CT), magnetic resonance imaging (MRI), positron emission tomography (PET), single photon emission computed tomography (SPECT), mammography, ultrasound, and so forth. Traditionally such imagery may be evaluated (i.e., read) by trained clinicians, such as radiologists. Such evaluations may be time consuming and subject to error or biases based on the training or particularities of individual readers. Over the last few decades, the introduction of computer-assisted diagnostics, automated image segmentation, and other automated processing and/or evaluation routines has simplified such reading procedures and improved the quality and consistency of such procedures.

Recently, such trends have extended with the advent of machine learning (ML) and the development of trained ML models and algorithms to further automate the evaluation of medical imagery. Such machine learning models, however, bring new complications to the processing and analysis of image data, as well as other data which they may be trained to process. By way of example, such machine learning models tend to be subject to or constrained by their training, and in particular to the training data sets used in their training. By way of further example, if the training data sets employed do not correspond with the types of data the machine learning model will be deployed to process, the trained machine learning model may make errors in its analysis. With this in mind, it may be appreciated that model debugging and failure characterization are particularly relevant in medical imaging since mere accuracy numbers are not representative of the severity of the failures. By way of example, if a particular race is under-represented in a test data set and if the model under-performs on the particular race, the average numbers may not be substantially affected and the failure mode may not be detected, leading to errors when deployed. For instance, if the machine learning model is trained solely using image data from adult patients, it may be prone to error if used to analyze image data of pediatric patients. As a corollary to this, a machine learning model trained to assess image data for a particular ailment (e.g., coronary blockage) may be prone to error when assessing imagery in which other ailments are present (e.g., aortic enlargement or distension, irregular valve structures, and so forth). As a result, while machine learning models help address many issues in certain data analysis contexts, they also raise new issues.

Prior approaches to addressing such have been problematic. In particular, identifying the factors causing or associated with the failure modes to which a machine learning model is subject may be time consuming and imprecise, often requiring domain experts to individually analyze failure cases in an attempt to identify similarities or root causes between failures, which may not be present when multiple failure modes exist. Further, many of the metrics or parameters by which an image, or failure mode associated with an image, may be classified may be quantitative in nature and exist along a continuum, from which it may be difficult to discern at what point a failure exists.

To overcome certain of these challenges, the presently disclosed and described approaches automatically identify failure modes and label them using more readily understood natural language descriptors provided using multi-modal representation learning frameworks. Due to the failure modes being characterized in natural language, a developer of the machine learning model may more readily develop models free from bias. In particular, the presently described techniques, by explaining failure modes semantically, enable easier and faster model corrections. Further, from the perspective of operating the model, it is useful to characterize the failure cases in readily understandable terms (e.g., natural language (NL)) so that appropriate actions can be taken improve and/or sustain the machine learning model performance. In this manner, the customer may benefit from sustained performance of the machine learning model despite the presence of input data drift.

To provide useful definitional context, as used herein a "failure case" may be understood to be an error (e.g., a mis-classification, mis-measurement, mis-diagnosis, and so forth) related to an individual case or image processed by a given machine learning model. Thus, a given failure case would correspond to a respective individual image or case processed by the machine learning model. A "failure mode" may be understood to be a systemic cause or factor explaining multiple failure cases (e.g., lack of contrast, poor image quality, presence or absence of a treatment device in the images, the subject does not fit the demographic profile of the training data employed for the machine learning model, and so forth). Thus, a failure mode is a factor or cause (e.g., root cause) related to a pattern of failure or systemic failures by the machine learning model and which correspondingly, may lead to multiple failure cases. In certain aspects, such a failure mode may be indicative of a missing classifier or of a confounder that may be present in the training data but unaccounted for or whose absence from the training data is problematic in view of the use data that is processed by the machine learning model. In certain embodiments described herein, a failure mode corresponds to a semantic definition of a failure, with the implication that, in general, if a sample has attributes corresponding to a respective failure mode, there is a higher propensity of the machine learning model to fail (i.e., generate a failure case) for that sample.

With this in mind, the present techniques facilitate the identification of factors causing or associated with failure modes in those cases identified as failure cases that are output from a machine learning model. In particular, such failure cases may be provided as inputs to a multi-modal representation learning framework which may receive as an input image data, time-series data, or other data in a first mode that is associated with a failure case of a machine learning model. As an output, the multi-modal representation learning framework may provide one or more text-based descriptors (e.g., natural language (NL) descriptors) for each of the failure cases. Alternatively, in other embodiments, multi-modal representation framework may provide an output in a different modality than text (e.g., images, graphs, signals, and so forth) that is distinct from the input modality. The text-based (or other) descriptors may be analyzed, such as via cluster-based analysis and/or histogram analysis, such that like or common descriptors are identified. Such clusters may be characterized as failure modes and/or may undergo review by a domain expert for such characterization and identification of the associated failure mode (e.g., small sample sizes for certain demographics used in training, usage of the machine learning model for uses for which it was not trained, and so forth). Once the factors causing or associated with these failure modes are identified, the machine learning model may undergo retraining, if in the development stage, to address the failure modes or instructions related to the failure mode(s) may be distributed to users of the machine learning model if the model is already deployed. In practice, the presently described techniques and methodologies are indifferent to the machine learning model methodology employed, and may be used in identifying factors causing or associated with failure modes for various different machine learning methodologies.

With the preceding in mind, in certain aspects the present approach improves the accessibility of failure mode information by providing text-based descriptions (e.g., natural language (NL) text-based descriptions) of all or part of the image data associated with a failure case. Due to the accessibility of the text-based descriptors relative prior approaches, developers or users of the machine learning model may more easily identify those factors leading to failures (i.e., failure modes) of the machine learning model. Appropriate action, either via re-training or instructive or corrective action for deployed machine learning models, may then be employed.

By way of example, in a medical imaging context, a machine learning model may be trained with image data drawn from an adult population. If such a model were used to analyzed image data for which a portion of the images (e.g., 80%) were of pediatric patients, a greater percentage of failures (e.g., 80%) might be observed for images of pediatric patients in comparison to images of adult patients, for which the model was properly trained. In such a context, semantic, textual descriptors that may be of use in helping a reviewer identify the cause of the failures might be text descriptors associated with each failure case indicative of the age of the patient, the correspondence between the anatomic size of the patient with pediatric patients, body proportions indicative of pediatric patients and so forth. In this manner, a reviewer might simply be able to review clusters or groups of the text descriptions to identify the likely common factor (e.g., pediatric patients) as opposed to reviewing actual quantitative anatomic measurements for each failure case, which might be more confusion, might lead to false confusions, would be more time consuming, and so forth.

While aspects of the following discussion may be provided in the context of medical imaging, it should be appreciated that the present techniques are not limited to medical imaging contexts. Indeed, the provision of examples and explanations in the context of medical imaging is only to facilitate explanation by providing instances of real-world implementations and applications. However, the present approaches may also be utilized in any computing context that involves processing of data in a first mode using a machine learning model such as, but not limited to, image data, video data, time-series data, and so forth. Correspondingly, the presently disclosed and described techniques improve and provide technical advantages in systems and devices in which they are implemented (e.g., computers and workstations, medical imaging systems, image archival systems, and so forth. As a result, such improved devices may operate more efficiently in terms of providing superior operation or performance using the same or fewer resources (e.g., computational resources, network bandwidth, and so forth).

Figure 2:
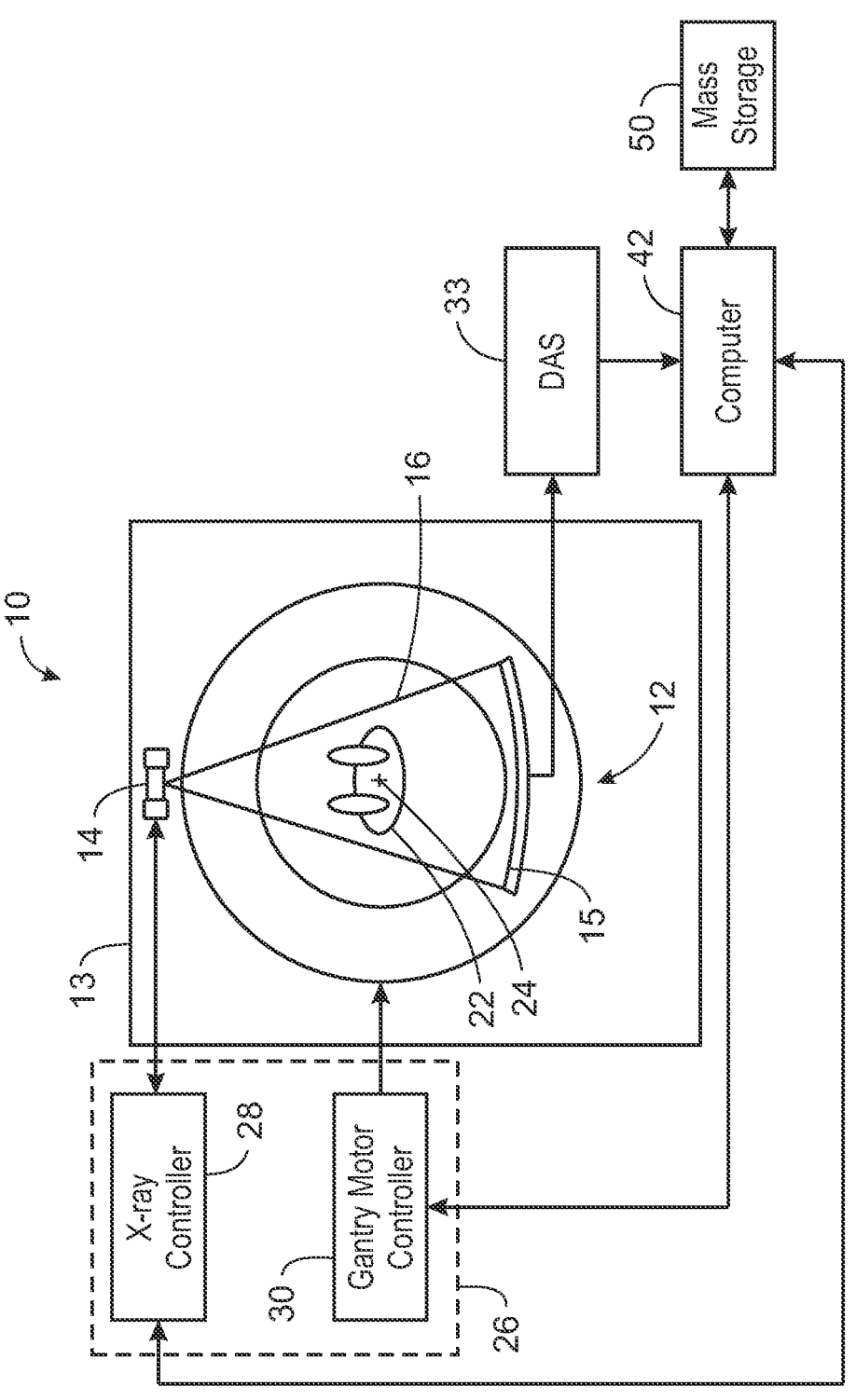
FIG. 2 is a block diagram of the imaging system in FIG. 1, in accordance with aspects of the present disclosure.

With the preceding in mind and referring to FIGS. 1 and 2, a CT imaging system 10 is shown, by way of example. As may be appreciated, the CT imaging system 10 disclosed and described with respect to FIGS. 1 and 2 merely provides a real-world example of the one type of device that may be present in a health care environment and that may generate complex data, e.g., volumetric image data of a living subject, that may be processed by a machine learning model, which in turn may be subject to failure cases. As may be appreciated, in a hospital or clinical context, numerous types of such electronic devices (e.g., imaging devices, patient monitors, diagnostic equipment, therapeutic equipment, and so forth) may be present and may each generate data or outputs that may be suitable for processing using a machine learning model and, correspondingly, may be subject to failure cases output by such machine learning models. With this in mind, FIGS. 1 and 2 describe one such system to illustrate both a real-world example of a possible system generating the underlying data being analyzed in such examples and the complexity that may be involved in such a system and its outputs that distinguishes such medical-type systems from what might be found in an office or other non-medical context.

With this in mind, and turning to the figures, the CT imaging system 10 (e.g., CT scanner) includes a gantry 12 having a housing 13 (e.g., gantry housing) and a rotating component and a stationary component. By way of example, the gantry 12 has an X-ray source 14 that projects a beam of X-rays 16 toward an X-ray detector assembly or X-ray detector array 15 (e.g., having a plurality of detector modules) on the opposite side of the gantry 12. The X-ray detector assembly 15 is coupled to data acquisition systems (DAS) 33.

The plurality of detector modules of the X-ray detector assembly 15 detect the projected X-rays that pass through a patient or subject 22, and DAS 33 converts the data to digital signals for subsequent processing. During a scan to acquire X-ray projection data, gantry 12 and the components mounted thereon rotate about a center of rotation 24 (e.g., isocenter) so as to allow volumetric imaging. Rotation of gantry 12 and the operation of X-ray source 14 are governed by a control mechanism 26. Control mechanism 26 includes an X-ray controller 28 that provides power and timing signals to the X-ray source 14 and a gantry motor controller 30 that controls the rotational speed and position of gantry 12.

A computer 42 (separate from or a part of the CT imaging system 10) may perform data correction unit and image reconstruction. By way of example, the computer 42 may receive sampled and digitized X-ray data from DAS 33 and perform high-speed image reconstruction. The reconstructed image may be stored in a mass storage device 50.

As may be appreciated, image data generated by an image system 10 or similar image system may be complex in nature and may benefit from processing using trained machine learning models to identify features of interest, perform classification or diagnostic tasks, segment structures for further analysis or processing, and so forth. However, as noted herein, such machine learning based processing may still be subject to error and may, in some instances generate failure cases, such as instances in which an image or structure within an image is mis-classified, where a parameter or value derived from the image is incorrect, or where other outputs of the machine learning model for a respective image do not correspond to a determination that might otherwise be made by a domain expert analyzing the image data.

Figure 3:
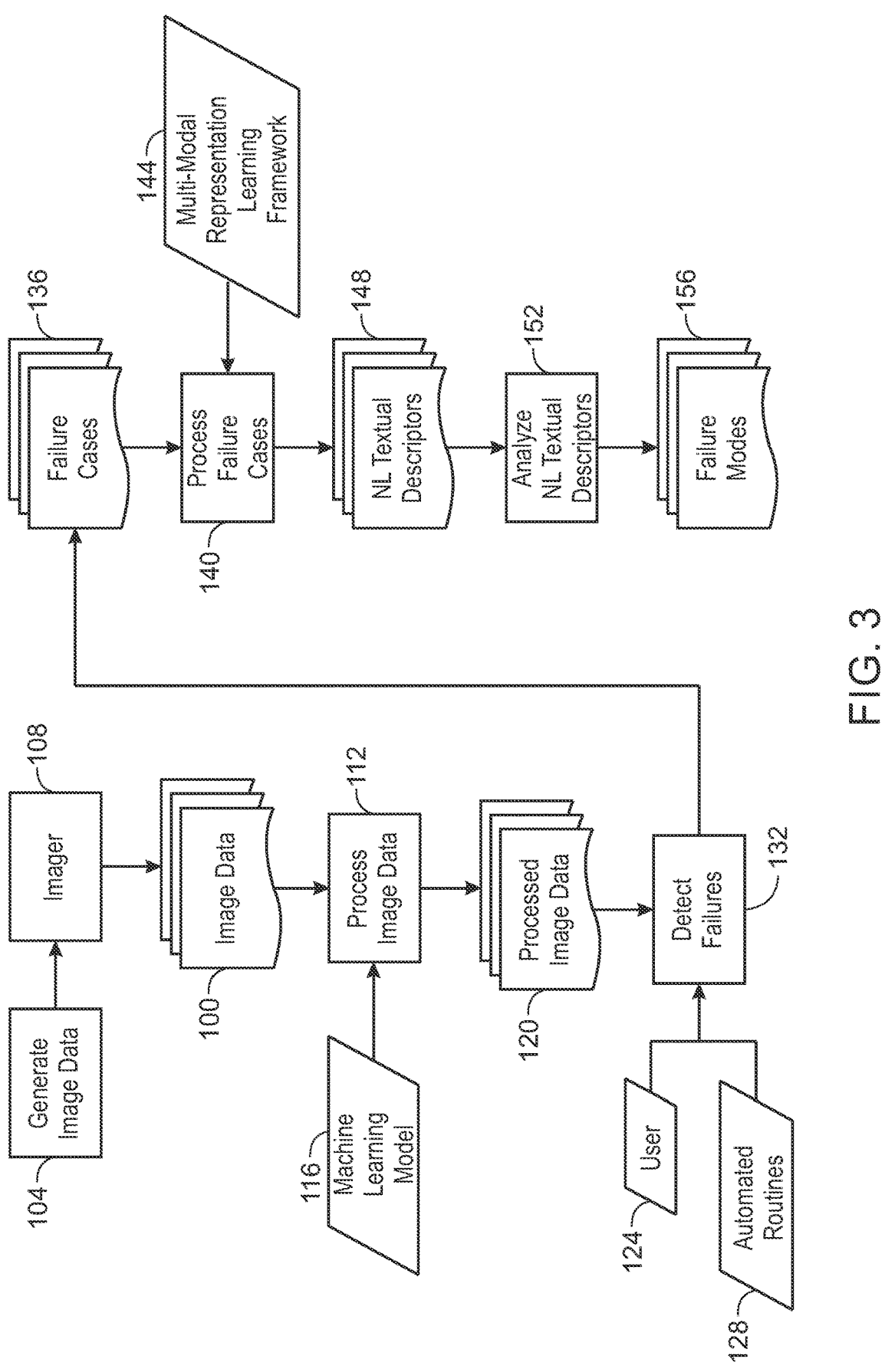
FIG. 3 depicts a process flow illustrating aspects of a failure mode determination process, in accordance with aspects of the present disclosure.

With the preceding context in mind and turning to FIG. 3, an example process flow is illustrated in which image data, such as may be generated using the image system 10 of FIGS. 1 and 2 or another modality of imaging system, is processed in accordance with techniques as described herein to identify factors causing or associate with failure modes of a machine learning model. As noted elsewhere herein, though image data is described by way of example and to provide useful context, in practice the machine learning models described and the techniques used to identify the factors causing or associated with failure modes of such machine learning models may be applied to other types of data suitable for processing by such machine learning models.

Turning to FIG. 3, image data 100 is initially generated (step 104), such as using a suitable imager 108 (e.g., image system 10 or another modality of imager). In the depicted example, the image data 100 may be processed (step 112) using a trained machine learning tool or model 116, such as a machine learning model trained to identify a region of interest (such as a diseased anatomic region, a tumorous region or growth, an anatomic anomaly, and so forth) within each image, to classify each image or a portion of each image, or to otherwise characterize, modify, or enhance all or part of each respective image. Correspondingly, the output of the machine learning model 116 may be a set of processed image data 120, which may in certain embodiments comprise a modified or annotated image for corresponding image of the image data set 100.

In the depicted example, the processed image data 120 may be evaluated, such as via a user 124 or automated routines 128 to detect (step 132) failure cases 136 within the processed image data 120. Such failure cases 136 may correspond to classification or identification failures by the machine learning model, annotation or segmentation failures, image enhancement failures, and so forth. Failure identification in this context may be via any suitable technique appropriate for the analytic context such as, but not limited to, comparison of a predicted versus observed variable, comparison to a threshold criterion, or domain expert review. In the depicted example, the failure cases 136 identified for the machine learning model 116 are processed (step 140) using a text description generating framework, such as a multi-modal representation learning framework 144. In this context, the multi-modal representation learning framework 144 receive an input of data in a first mode (e.g., image data or time-series data) and provides a corresponding output or outputs in a second mode, such as text-based descriptors 148 (e.g., natural language (NL) text-based descriptors) or, alternatively, graphs, signals, and so forth. By way of example, the multi-modal representation learning framework 144 may process the image data corresponding to each failure case 136 and generate or select one or more representative text-based descriptors that describe one or more aspects of the image data. In terms of practical implementation, the multi-modal representation learning framework 144 may employ predictive learning might. In certain embodiments the multi-modal representation learning framework 144 may be configured using an "encode+decoder" configuration so as to predict one mode (e.g., text) from the other mode (e.g., an image).

Examples of possible multi-modal representation learning frameworks 144 include, but are not limited to, foundational models such as ImageBind and CLIP (Contrastive Language-Image Pre-Training). By way of example, CLIP is a neural network that is trained on a variety of (e.g., image, text) pairs and which can output natural language text descriptors. In the present context, CLIP can be instructed to infer the most relevant text descriptor based on an image and does not require being optimized for the task. In such contexts, contrastive representation may be understood to capture information that is shared by multiple sources (e.g., images, text) so as to maximize mutual information. As discussed herein, such a network may employ predictive learning and/or may be configured using an "encode+decoder" configuration so as to facilitate prediction of text from another mode (e.g., an image or time-series data). In practice, a CLIP framework may be trained as a multi-modal embedding space by jointly training an image and a text encoder by maximizing (image, text) mappings and penalizing erroneous mappings and/or upweighting correct mappings. In this manner, a CLIP framework, when provided an image (e.g., a failure case image in the present context) may output representative, natural-language text describing the image or portions of the image. In this manner, one or more natural language text descriptors may be automatically generated for each failure case image.

In the depicted example, the standardized, text-based descriptors may in turn be analyzed (step 152), such as via cluster-based analysis and/or histogram analysis to identify common or representative text descriptions. As an output of such an analysis, one or more factors causing or associated with the failure modes 156 of the machine learning model 116 may be identified. By way of example, the multi-modal representation learning framework 144 may output set or defined natural language text descriptions for each failure case image, such as "head circumference <10 cm", "head circumference=5 cm", and so forth that may be clustered based on their content for automated analysis and/or which provide readily deciphered natural language cues for a human reviewer. In such a context common or more frequently observed text descriptions, whether clustered or reviewed by a human, may be identified that may be indicative of the causes of a common failure mode 156 for multiple of the failure cases 136. In this manner, a developer or data scientist may be provided with easily understood data which allows them to formulate an appropriate response to a respective failure mode of the machine learning model. In certain embodiments, analysis (step 152) of the textual descriptors 148, identification of failure modes 156 based on such an analysis, and/or remediation (e.g., re-training the machine learning model 116 based on an updated training data set, generating corrective actions for deployed machine learning models 116, and so forth) of failure modes 156 identified in this manner may be automated (e.g., performed automatically, such as by one or more automate routines, frameworks, or networks). The factors causing or associated with the failure modes 156, once identified may be addressed in a manner suitable for the state of the machine leaning model (e.g., in development or deployed).

Figure 4:
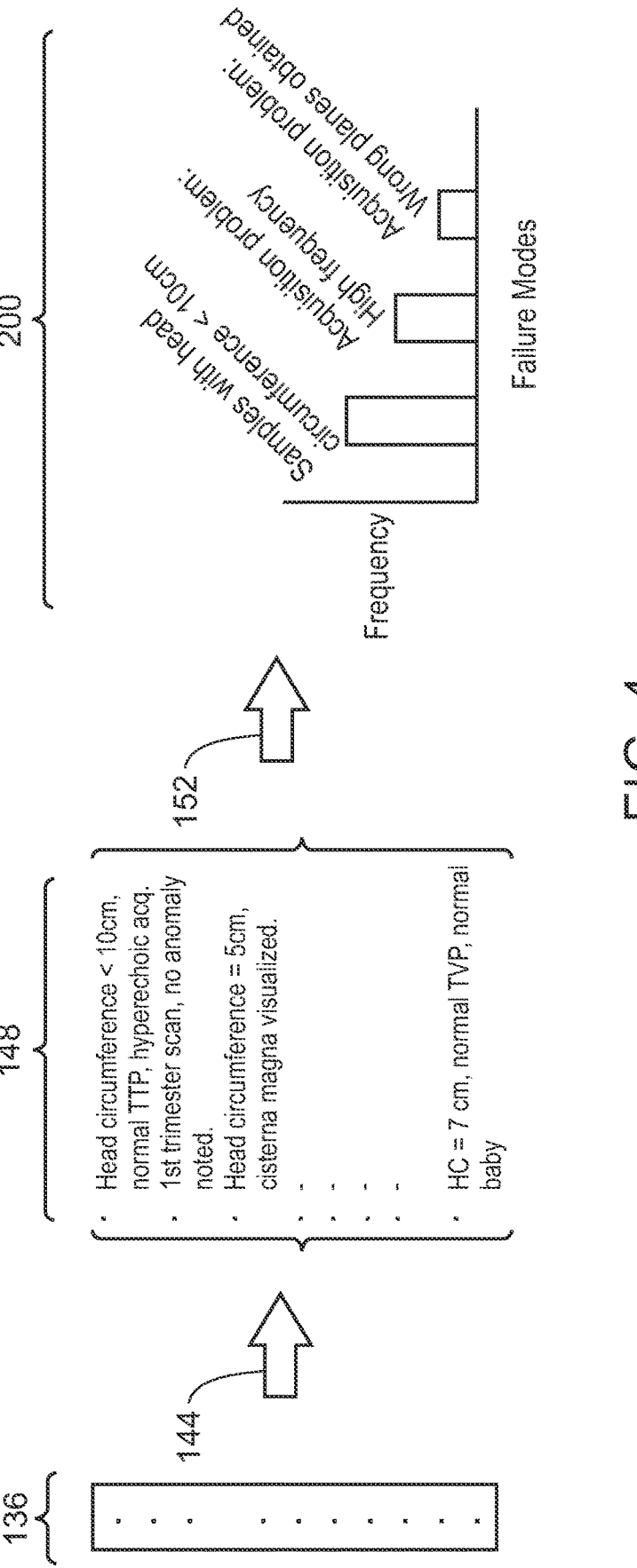
FIG. 4 schematically illustrates aspects of a failure mode determination process based on textual descriptors, in accordance with aspects of the present disclosure.
Figure 5:
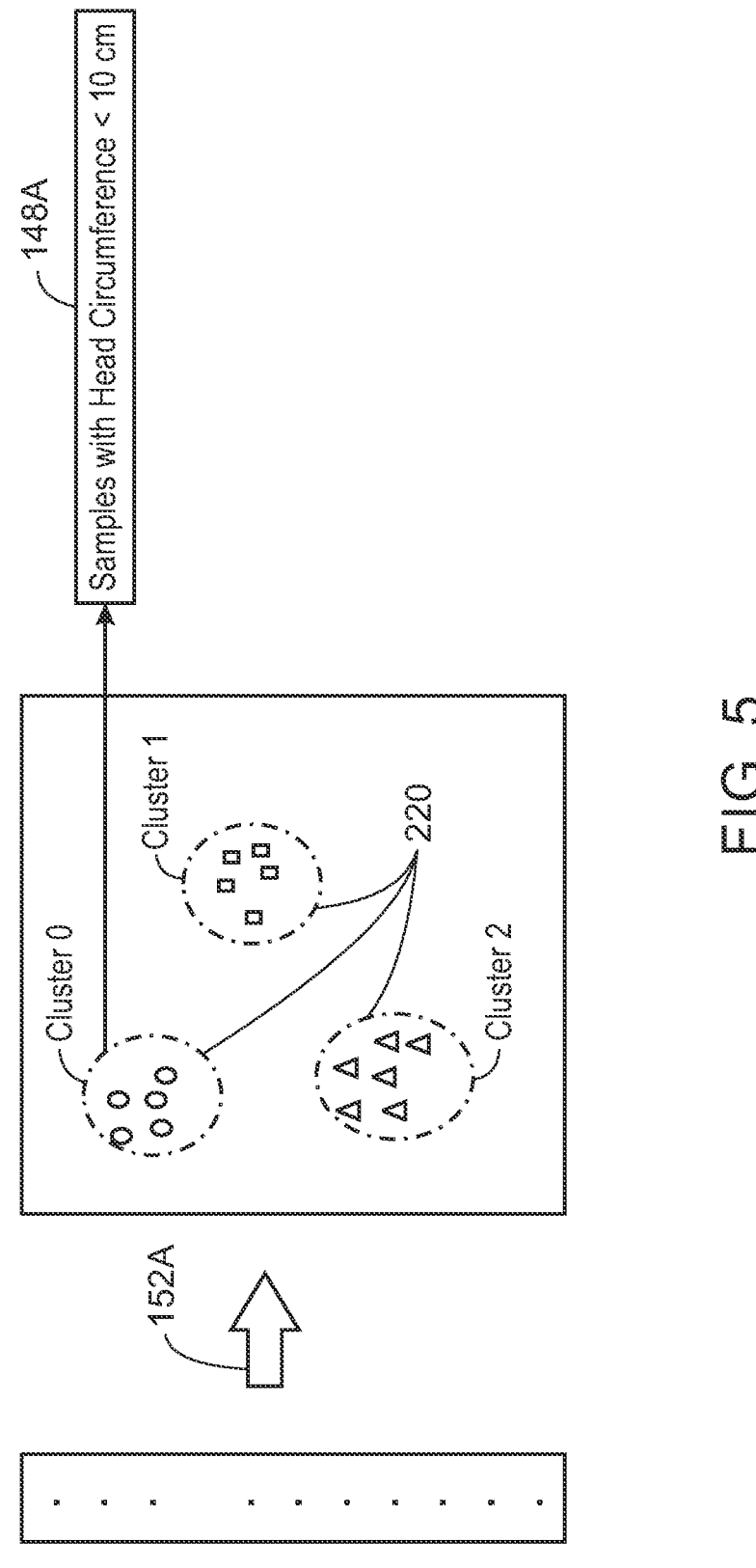
FIG. 5 schematically illustrates aspects of a failure mode determination process based on textual descriptors and cluster-based analysis, in accordance with aspects of the present disclosure.
Figure 6:
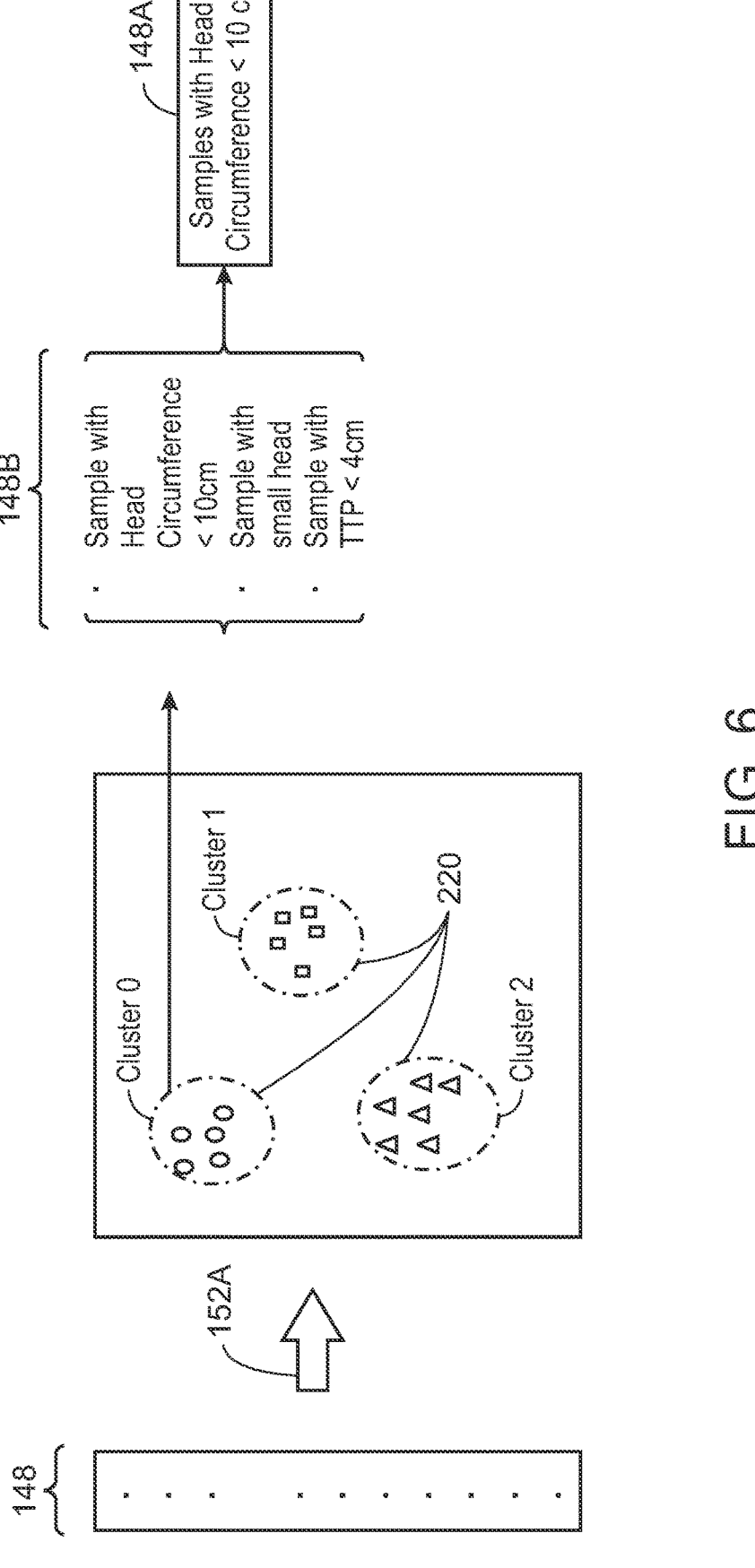
FIG. 6 schematically illustrates aspects of a failure mode determination process based on non-identical textual descriptors and cluster-based analysis, in accordance with aspects of the present disclosure.

Turning to FIGS. 4, 5, and 6, an example of the technique described herein is provided in schematic form. In this example, a set of failure cases 136 (e.g., 20, 50, 100, 500, or 1,000 failure cases, and so forth) each having a corresponding image output by a machine learning model 116 is depicted. As discussed herein, such failure cases 136 may be identified manually, such as by a reviewer of the machine learning processed image, and/or may be identified automatically, such as via one or more quality control, region comparison, or error detection routines configured to identify regional or image wide inconsistencies or errors indicative of a failure case 136 within the corresponding machine learning processed image.

In the depicted example, the images corresponding to the failure cases 136 are processed using a multi-modal representation learning framework 144 as discussed herein. By way of example, the images corresponding to the failure cases 136 may be provided as inputs to a CLIP (Contrastive Language-Image Pre-Training) neural network that is trained using various multi-modal pairs (e.g., image, text pairs). As shown in this example, the output of the multi-modal representation learning framework 144 (e.g., a CLIP neural network) is a corresponding set of textual descriptors 148 (e.g., natural language (NL) text descriptors). In practice, there may be a single textual descriptor 148 generated for or corresponding to each failure case image (e.g., 1:1) or there may be one or more than one textual descriptor 148 generated for or corresponding to each failure case image, depending on the failure case 136 and/or the operation of the multi-modal representation learning framework 144. As shown in the depicted example, the textual descriptors 148 may be natural language (NL) descriptors that are generated automatically by the multi-modal representation learning framework 144 in response to the input images corresponding to the failure case 136

In certain embodiments the textual descriptors 148 (e.g., natural language (NL) text descriptors) may be processed (step 152) using suitable statistical techniques, such as but not limited to cluster-based analysis and/or histogram analysis. In this manner, like textual descriptors 148 may be clustered or otherwise grouped or binned together and/or error rates or counts for such clusters or groupings generated. In the depicted example, after clustering to identify relevant clusters, groupings, or bins, a failure mode visualization 200 (here depicted as a histogram) may be made conveying a frequency or count (y-axis) versus the different identified clusters (x-axis). In the depicted example, each bar of the histogram visually represents and corresponds to a failure mode 156. A reviewer having access to the visualization may thereby readily identify likely failure modes 156 and their count or rate within the sample of failure cases 136. The most problematic or frequent failure modes 136 may in this manner be identified and responses prioritized accordingly, either via re-training of the machine learning model 116 used to process the acquired image data and/or re-training of the clinical technicians acquiring images to be processed.

Turning to FIG. 5, a further schematic illustration of the analysis step is depicted to facilitate explanation. In this example, a cluster-based approached is illustrated visually by which textual descriptors 148 generated by a multi-modal representation learning framework 144 (such as a CLIP neural network) are analyzed using cluster analysis (step 152A). In this context, the cluster-based analysis step 152A may generate one or more statistically-derived clusters 220, each having a respective count of failure cases 136 corresponding to the respective cluster 220 and each potentially corresponding to a respective failure mode 156. In such an example, each cluster 220 may correspond to an identical textual descriptor 148A for the purpose of review. Each textual descriptor 148, as discussed herein, has an underlying failure case 136 for which it was derived using the multi-modal representation learning framework 144 and each may correspond to or be used to describe a respective failure mode 156.

Alternatively, and as illustrated in FIG. 6, in some implementations some or all of the clusters 220 may correspond to multiple statistically similar textual descriptors 148B, such as statistical descriptors describing a respective anatomic feature or measurement or describing an image marker or characteristic as being above or beyond an expected threshold. In this example the related textual descriptors 148 for each cluster 220 may correspond to the same failure mode 156. Each textual descriptor in the set of textual descriptors 148B, and as discussed herein, has an underlying failure case 136 for which the textual descriptors 148B were derived using the multi-modal representation learning framework 144. In the depicted example, the set of similar or related textual descriptors 148B associated with a respective cluster 220 may be summarized or characterized by a single natural language textual descriptor 148A for review by a reviewer or for further analysis or processing, such as via histogram analysis or other visualization techniques. In one such example, the single natural language textual descriptor 148A may be useful to characterize or describe the corresponding failure mode 156.

With the preceding examples in mind, and as discussed herein, in practice understanding each cluster 220 may require or benefit from domain knowledge or understanding, which was not always feasible to leverage in certain technical areas. In particular, the characterization of clusters 220 using natural language text descriptors facilitates bringing such domain knowledge to bear and like cases are summarized together, allowing a domain expert to more readily identify failure mode issues.

Figure 7:
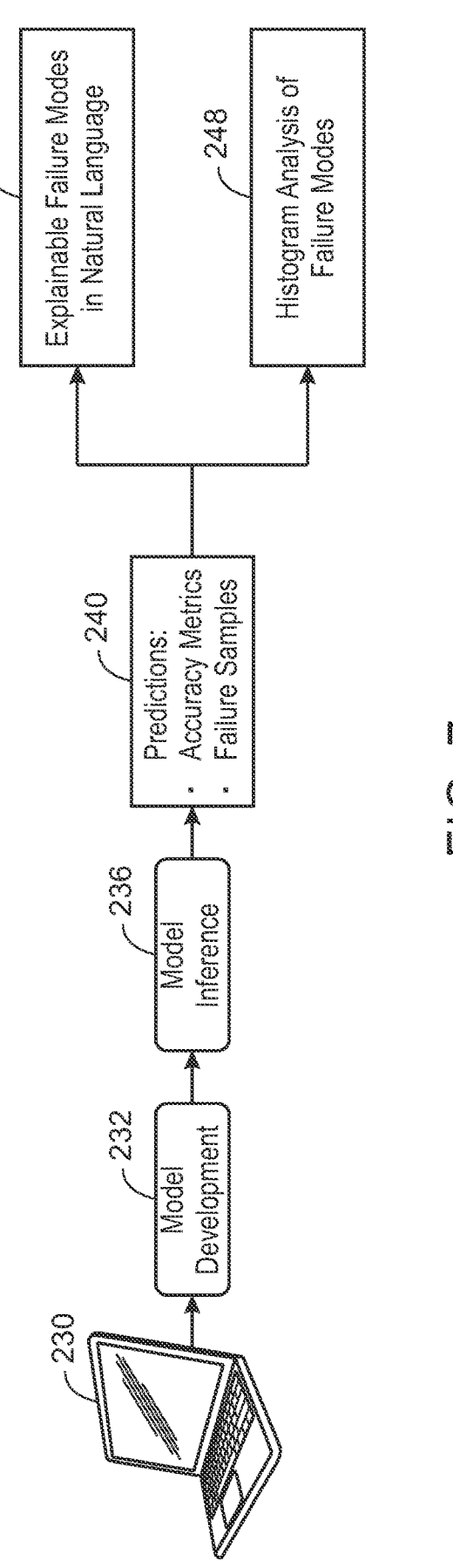
FIG. 7 schematically illustrated aspects of a machine model development process utilizing failure modes described using natural language descriptors, in accordance with aspects of the present disclosure.

Turning to FIG. 7, a schematic illustration of a development workflow for a machine learning model 116 is illustrated that utilizes aspects of the presently described techniques. In this example, a workstation 230 or other processor-based system may be employed to develop and train (step 232) a machine learning model 116, such as a machine learning model 116 trained to classify all or part of medical images, to generate a diagnosis, prognosis, therapy recommendation and so forth based on medical images, and/or to otherwise process an image or other suitable data construct. In practice, the workstation 230 may execute automated routines as part of developing or training the machine learning model 116 and/or may be configured to display a development or training interface and receive inputs, such as from a developer or data scientist, to facilitate developing or training the machine learning model 116. Once trained the machine learning model 116 may be provided input data (e.g., medical images, time-series data, and so forth) to generate model inferences (step 236) corresponding to outputs or predictions generated by the machine learning model 116 based upon the its training.

In the depicted example the output predictions 240 may comprise one or more accuracy metrics or other quality control measures or parameters. As discussed herein, the respective accuracy metrics (or, alternatively, review by a clinician or other reviewer) may be used to identity failure cases 136. In conventional practice such accuracy metrics may be insufficient to identify failure modes due to their complexity and/or lack of clarity as to underlying root or common factors. By way of example, automated routines used to analyze such metrics and/or human reviewers may lack sufficient domain knowledge to be able to readily identify failure modes 156 of the machine learning model 116 simply from the accuracy metrics and/or the cases identified as failure cases 136.

With this in mind, and as discussed herein, the failure cases 136 may in turn be processed as discussed herein using a multi-modal representation learning framework 144 configured to generate textual descriptors (e.g., natural language (NL) text descriptions) for each failure case 136 which may be statistically or graphically analyzed to identify failure modes 156 of the machine learning model 116. This aspect is illustrated in FIG. 7 in which the automated or human reviewer may leverage one or both of explainable failure modes in natural language (block 244) and/or a histogram or other easily reviewed graphical analysis of failure modes (block 248) to identify one or more failure modes 156 to be addressed either in the development or re-training of the machine learning model 116 and/or in the use or implementation of a deployed machine learning model 116. By way of example, in a development setting a workstation 230 may be used to facilitate visualization of the relevant failure modes 156, the prevalence of such failure modes 156, and/or their relative or disproportionate impact on use of the machine learning model 116. Such analysis may be useful in reconfiguring or supplementing a training data set used to train the machine learning model 116. In a deployment context, such analyses may be useful in providing instructions or guidance to users of the machine learning model 116 so as to allow such users to avoid the identified failure modes 156 or to mitigate the impact of the failure modes 156.

With the preceding discussion in mind, it may be noted that the techniques described and disclosed herein related to the use of a multi-modal representation learning framework 144 configured to generate textual descriptors 148 (e.g., natural language (NL) text descriptions) for failure cases 136 of machine learning models 116 provides certain technical improvements over prior techniques. By way of example, in accordance with conventional approaches, debugging machine learning models 116 may be a domain knowledge intensive task, typically beyond the knowledge of developers or data scientist tasked with creating and training such machine learning models 116. This lack of domain knowledge among developers of the machine learning model 116 may result in such developers attributing failure cases 136 to noise or other unexplained factors when a root cause (e.g., failure mode 156) is actually present. As discussed herein, the presently described techniques address these concerns by using a multi-modal representation learning framework 144 to process failure cases 136 and generate easily readable or parsable characterizations of the data underlying the failure cases in the form of textual descriptors 148 that may be reviewed directly by a developer or data scientist and/or may be analyzed using statistical techniques (e.g., cluster-based analysis) and/or graphical techniques (histogram analysis) to facilitate identification of failure modes 156.

Figure 8:
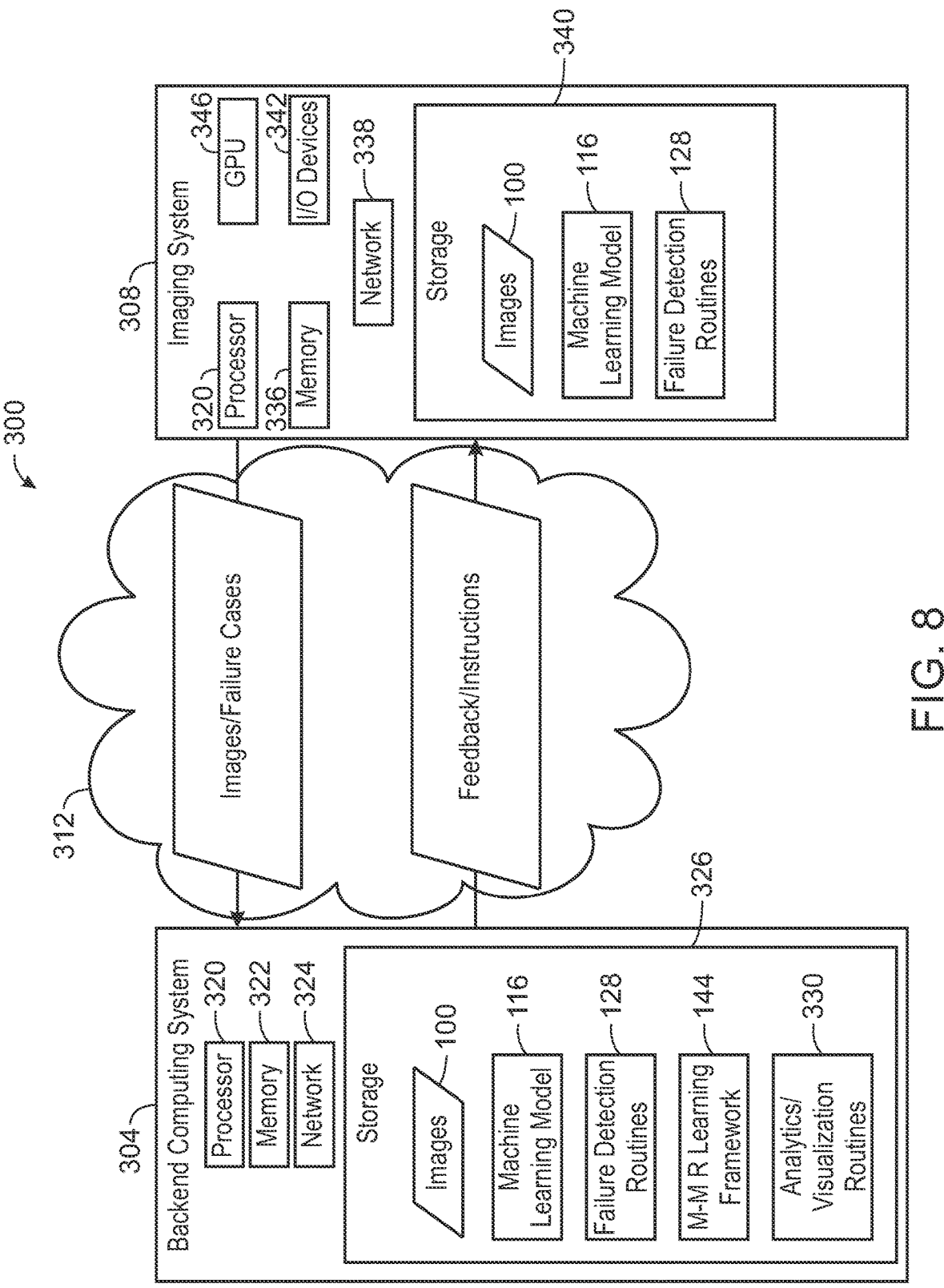
FIG. 8 is a diagram of a client-server architecture for medical image processing and analysis, in accordance with embodiments of the present technique.

With the preceding in mind, FIG. 8 illustrates an embodiment of client-server or cloud-based architecture 300 for medical image processing and analysis in accordance with the presently described techniques. In the depicted example, the client-server or cloud-based architecture 300 generally includes at least one backend computing system 304 and at least one frontend computing system, here represented as an imaging system 308 (e.g., a CT imaging system 10) that is communicatively coupled, directly or indirectly, via a suitable network 312 (e.g., a local area network (LAN), a wide area network (WAN), virtual private networks (VPN), the internet). In some embodiments, the backend computing system 304 may include at least one server deployed on a LAN of a medical facility. For embodiments in which the client-server architecture 300 is wholly or partially a cloud-based client-server architecture, the backend computing system 304 may include one or more rack-mounted servers deployed at a remote data center. The imaging system 308 may include or may be coupled to a desktop or laptop computer of a clinician, for example, deployed on the LAN of a medical facility or coupled to the backend computing system 304 via a suitable network connection.

In the following description it should be appreciated that certain functionality may be implemented on the backend computing system 304, the frontend computing system (e.g., the imaging system 308 and/or associated workstation), or both. As such certain routines and/or functionality may be described as possibly being present on both the backend computing system 304 and/or the imaging system 308 (or associated workstation). In practice, such routines or functionality will likely be implemented on only one of the frontend or backend, as determined based on implementation and business specific decisions. For completeness, however, the present discussion will describe such functionality as potentially being implemented on either the front or back end.

With this in mind, in the depicted example, the backend computing system 304 includes at least one processor 320, at least one memory 322 (e.g., random access memory (RAM), read-only memory (ROM)), at least one networking device 324 (e.g., a wireless networking card, an Ethernet networking card), and at least one storage device 326 (e.g., non-transitory computer readable media, such as, but not limited to, a hard disk device, a solid-state disk device, a flash memory device). The processor 320 may include one or more central processing units (CPUs), each having one or more processing cores configured to execute instructions and process data loaded into the memory 322 from the storage 326. The storage 326 of the backend computing system 304, in the present context, may store images 100 (e.g., medical images or scans), processor-executable routines for implementing a machine learning model 116 (e.g., a machine learning classification model, diagnostic model, segmentation or image processing model, and so forth) used to process image data 100 (or other suitable data), one or more processor-executable failure detection routines or frameworks 128 configured to identify failure cases 136 from the output of the executed machine learning model 116, processor-executable routine for implementing a multi-modal representation learning framework 144 for processing the data associated with the failure cases 136 and to output corresponding textual descriptors 148 (e.g., natural language (NL) text descriptions) for the failure cases 136 of the machine learning model 116, and/or one or more processor-executable analytics and/or visualization routines 334 for performing statistical analysis and/or visualization of the outputs (e.g., natural language text descriptions) of the multi-modal representation learning framework 144.

The frontend computing system, here represented as an imaging system 308 or workstation associated with such an imaging system, generally includes at least one processor 334, at least one memory 336 (e.g., random access memory (RAM), read-only memory (ROM)), at least one networking device 338 (e.g., a wireless networking card, an Ethernet networking card), and at least one storage 340 (e.g., non-transitory computer readable media, such as, but not limited to, a hard disk device, a solid-state disk device, a flash memory device). Additionally, the imaging system 308 includes input/output (I/O) devices 342, such as a keyboard, mouse, touchpad, touchscreen, speakers, displays, and so forth, which enable the clinician to provide inputs to, and receive the outputs of, the imaging system 308. In certain embodiments, the imaging system 308 includes at least one graphics processing unit 346 (GPU) that is generally configured to perform graphical processing to present images on display devices of these imaging system 308. The storage 340, in the present context, may store images 100 (e.g., medical images or scans), processor-executable routines for implementing a machine learning model 116 (e.g., a machine learning classification model, diagnostic model, segmentation or image processing model, and so forth) used to process image data 100 (or other suitable data), and/or one or more processor-executable failure detection routines or frameworks 128 configured to identify failure cases 136 from the output of the executed machine learning model 116.

In the depicted example, information is illustrated as being exchanged between the imaging system 308 and the backend computing system 304. In practice, such data may include, but is not limited to, image and or failure case data 350, which may be transmitted from the imaging system 308 to the backend computing system 304, with the particular types of data transferred depending in part on where failure detection functionality is performed.

By way of example, in a first implementation image data 100 acquired by the imaging system 308 (e.g., a CT imaging system 10) may be transmitted to the backend computing system 304, where it may be processed using the machine learning model 116 implemented on the backend computing system 304. In one such example, the processed image data output by the machine learning model 116 may be processed or otherwise analyzed by one or more failure detection routines 128 executed on the backend computing system 304 to identify failure cases 136. A multi-modal representation learning framework 144 implemented or executed on the backend computing system(s) 304 may then be utilized to generate textual descriptors 148 (e.g., natural language (NL) text descriptions) for the images 100 associated with the failure cases 136 of the machine learning model 116. In the depicted example, one or more analytics and/or visualization routines, as discussed herein, may also be executed, such as to process the textual descriptors 148 output by the multi-modal representation learning framework 144 to generate bins or clusters corresponding which may be reviewed, such as by a developer, to identify or to confirm failure modes 156 of the machine learning model 116. In the depicted example, one or more of feedback or instructions may be transmitted back to the imaging system 308, though such data may not be conveyed in all instances.

In another implementation, additional functionality may be performed on the frontend. In this example, the image data 100 acquired by the imaging system 308 (e.g., a CT imaging system 10) may be processed on the imaging system 308 (or other frontend system(s)) via a locally implemented machine learning model 116 as discussed herein. In one such example, the processed image data output generated by the machine learning model 116 may be transmitted to the backend computing system 304, where failure detection routines 128 may be executed so as to identify failure cases 136. In this example, the multi-modal representation learning framework 144 may be implemented or executed on the backend computing system(s) 304 so as to generate textual descriptors 148 (e.g., natural language (NL) text descriptions) for the images 100 associated with the failure cases 136 of the machine learning model 116. In the depicted example, one or more analytics and/or visualization routines, as discussed herein, may also be executed, such as to process the textual descriptors 148 output by the multi-modal representation learning framework 144 to generate bins or clusters corresponding which may be reviewed, such as by a developer, to identify or to confirm failure modes 156 of the machine learning model 116. In the depicted example, one or more of feedback or instructions may be transmitted back to the imaging system 308, though such data may not be conveyed in all instances.

In a further implementation, additional functionality may be performed on the frontend. In this example, the image data 100 acquired by the imaging system 308 (e.g., a CT imaging system 10) may be processed on the imaging system 308 (or other frontend system(s)) via a locally implemented machine learning model 116 as discussed herein. In one such example, the processed image data output generated by the machine learning model 116 may be further processed on the frontend (such as via imaging system 308 or an associated workstation, using locally implemented failure detection routines 128 so as to identify failure cases 136. The failure cases 136 and associated image data 100 may be transmitted to the backend computing system 304, where a multi-modal representation learning framework 144 may be implemented or executed so as to generate textual descriptors 148 (e.g., natural language (NL) text descriptions) for the images 100 associated with the failure cases 136 of the machine learning model 116. In the depicted example, one or more analytics and/or visualization routines, as discussed herein, may also be executed on the backend computing system 304, such as to process the textual descriptors 148 output by the multi-modal representation learning framework 144 to generate bins or clusters corresponding which may be reviewed, such as by a developer, to identify or to confirm failure modes 156 of the machine learning model 116. In the depicted example, one or more of feedback or instructions may be transmitted back to the imaging system 308, though such data may not be conveyed in all instances.

As may be appreciated from the preceding examples, aspects of the presently described techniques may be such as machine learning based image processing, failure detection, multi-modal text descriptor generation, and analysis/visualization may be performed at one location or may be distributed between systems, such as between local and cloud-based systems. While the preceding examples relate certain possible implementation scenarios, it may be appreciated that other practical implementations may be performed and are contemplated by the present disclosure. Further, it may be appreciated that aspects of the preceding examples may be mixed to achieve hybrid implementations, such as where multiple imaging systems 308 are present having different capabilities (e.g., different models) and thus may each perform different degrees of processing on the frontend. That is, in certain hybrid scenarios certain imaging systems 308 may transmit unprocessed image data to the backend computing system 304 while other imaging systems 308 may transmit the machine learning processed image data and/or the failure case data and imagery. Thus, the present examples should be understood in view of their intent to provide useful context and implementation scenarios, but not as an exhaustive listing of all possible implementations or permutations.

With the preceding discussion and explanation in mind, it may be appreciated that technical advantages of the presently disclosed techniques include, but are not limited to, improvements to imaging process and imaging systems or devices in general, including medical imaging systems and devices in particular. The present approaches may also be utilized in, and present technical advantages with respect to, any computing context that involves processing of data in a first mode using a machine learning model such as, but not limited to, image data, video data, time-series data, and so forth. Correspondingly, the presently disclosed and described techniques improve and provide technical advantages in systems and devices in which they are implemented (e.g., computers and workstations, medical imaging systems, image archival systems, and so forth. As a result, such improved devices may operate more efficiently in terms of providing superior operation or performance using the same or fewer resources (e.g., computational resources, network bandwidth, and so forth).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A processor-implemented method for determining one or more failure modes of a machine learning model, comprising:

accessing or acquiring one or more images from a first source;

processing the one or more images using the machine learning model, wherein the machine learning model outputs one or more processed images;

detecting one or more failure cases of the machine learning model in the one or more processed images;

processing one or more respective images corresponding to the one or more failure cases using a text description generating framework configured to generate one or more text descriptors for each image corresponding to a failure case;

determining one or more failure modes of the machine learning model based on the one or more text descriptors generated for the images corresponding to the failure cases; and retraining the machine learning model based on the one or more failure modes or providing guidance to users of the machine learning model based on the one or more failure modes, wherein the guidance comprises, at a deployment stage, generating from the one or more text descriptors one or more instructions for the users of the deployed machine learning model and presenting the instructions during operation of the deployed model when a failure case is detected, the instructions specifying corrective actions for operation of the machine learning model and being derived from the one or more text descriptors corresponding to the detected failure modes.

2. The processor-implemented method of claim 1, further comprising:

prior to determining the one or more failure modes of the machine learning model, analyzing the text descriptors generated for the images corresponding to the failure cases using cluster analysis to generate one or more clusters, wherein each cluster corresponds to a respective failure mode of the one or more failure modes.

3. The processor-implemented method of claim 1, further comprising:

prior to determining the one or more failure modes of the machine learning model, analyzing the text descriptors generated for the images corresponding to the failure cases using a histogram, wherein each bar of the histogram corresponds to a respective failure mode of the one or more failure modes.

4. The processor-implemented method of claim 1, further comprising:

prior to determining the one or more failure modes of the machine learning model, analyzing the text descriptors generated for the images corresponding to the failure cases using cluster analysis to generate one or more clusters, wherein each cluster corresponds to a respective failure mode of the one or more failure modes; and analyzing the one or more clusters using a histogram, wherein each bar of the histogram corresponds to a respective failure mode of the one or more failure modes.

5. The processor-implemented method of claim 1, wherein the one or more images are medical images acquired using a medical imaging device.

6. The processor-implemented method of claim 1, wherein the machine learning model is trained to identify a region of interest within each image, to classify each image or a portion of each image, or to otherwise characterize, modify, or enhance all or part of each image.

7. The processor-implemented method of claim 1, wherein detecting the one or more failure cases comprises receiving an input from a reviewer indicating the one or more failures.

8. The processor-implemented method of claim 1, wherein the one or more failures cases are detected by one or more automated failure detection routines based on one or more accuracy metrics.

9. The processor-implemented method of claim 1, wherein the text description generating framework comprises a multi-modal representation learning framework.

10. The processor-implemented method of claim 1, wherein the one or more text descriptors comprise one or more natural language text descriptors and wherein the one or more failure modes are characterized using natural language.

11. One or more non-transitory computer-readable media, the computer-readable media comprising processor-executable code that, when executed by a processor, causes the processor to perform acts comprising:

accessing or acquiring one or more images from a first source;

processing the one or more images using a machine learning model, wherein the machine learning model outputs one or more processed images;

detecting one or more failure cases of the machine learning model in the one or more processed images;

processing one or more respective images corresponding to the one or more failure cases using a text description generating framework configured to generate one or more text descriptors for each image corresponding to a failure case;

determining one or more failure modes of the machine learning model based on the text descriptors generated for the images corresponding to the failure cases; and retraining the machine learning model based on the one or more failure modes or providing guidance to users of the machine learning model based on the one or more failure modes, wherein the guidance comprises, at a deployment stage, generating from the one or more text descriptors one or more instructions for the users of the deployed machine learning model and presenting the instructions during operation of the deployed model when a failure case is detected, the instructions specifying corrective actions for operation of the machine learning model and being derived from the one or more text descriptors corresponding to the detected failure modes.

12. The one or more non-transitory computer-readable media of claim 11, wherein the processor-executable code further comprises code that when executed by the processor, causes the processor to perform further acts comprising:

prior to determining the one or more failure modes of the machine learning model, analyzing the text descriptors generated for the images corresponding to the failure cases using cluster analysis to generate one or more clusters, wherein each cluster corresponds to a respective failure mode of the one or more failure modes.

13. The one or more non-transitory computer-readable media of claim 11, wherein the machine learning model is trained to identify a region of interest within each image, to classify each image or a portion of each image, or to otherwise characterize, modify, or enhance all or part of each image.

14. The one or more non-transitory computer-readable media of claim 11, wherein the one or more failures cases are detected by one or more automated failure detection routines based on one or more accuracy metrics.

15. The one or more non-transitory computer-readable media of claim 11, wherein the text description generating framework comprises a multi-modal representation learning framework.

16. The one or more non-transitory computer-readable media of claim 11, wherein the one or more text descriptors comprise one or more natural language text descriptors.

17. A processor-based system, comprising:

one or more processors configured to execute processor-executable code; and one more memory or data storage structures storing processor-executable code, which when executed by the one or more processors, causes the one or more processors to perform acts comprising:

accessing or acquiring one or more images from a first source;

processing the one or more images using a machine learning model, wherein the machine learning model outputs one or more processed images;

detecting one or more failure cases of the machine learning model in the one or more processed images;

processing one or more images corresponding to the one or more failure cases using a text description generating framework configured to generate one or more text descriptors for each image corresponding to a failure case;

determining one or more failure modes of the machine learning model based on the text descriptors generated for the images corresponding to the failure cases; and retraining the machine learning model based on the one or more failure modes or providing guidance to users of the machine learning model based on the one or more failure modes, wherein the guidance comprises, at a deployment stage, generating from the one or more text descriptors one or more instructions for the users of the deployed machine learning model and presenting the instructions during operation of the deployed model when a failure case is detected, the instructions specifying corrective actions for operation of the machine learning model and being derived from the one or more text descriptors corresponding to the detected failure modes.

18. The processor-based system of claim 17, wherein the processor-executable code further comprises code that when executed by the processor, causes the processor to perform further acts comprising:

prior to determining the one or more failure modes of the machine learning model, analyzing the text descriptors generated for the images corresponding to the failure cases using cluster analysis to generate one or more clusters, wherein each cluster corresponds to a respective failure mode of the one or more failure modes.

19. The processor-based system of claim 17, wherein the one or more failures cases are detected by one or more automated failure detection routines based on one or more accuracy metrics.

20. The processor-based system of claim 17, wherein the one or more text descriptors comprise one or more natural language text descriptors.

\*　\*　\*　\*　\*